United States Patent [19]

Loe et al.

[11] Patent Number: 4,750,873
[45] Date of Patent: Jun. 14, 1988

[54] DEVICE FOR THE PRODUCTION OF A TUBULAR OBJECT

[75] Inventors: David O. Loe, Mijdrecht; Gerrit J. Van Keimpema, Woerden, both of Netherlands

[73] Assignee: Koninklijke Emballage Industrie Van Leer B.V., Amstelveen, Netherlands

[21] Appl. No.: 883,123

[22] Filed: Jul. 8, 1986

[30] Foreign Application Priority Data

Jul. 15, 1985 [NL] Netherlands ............... 8502034

[51] Int. Cl.$^4$ .............................................. B29C 47/88
[52] U.S. Cl. ........................................ 425/71; 264/519;
264/558; 264/560; 264/209.4; 264/237;
264/348; 425/72 R; 425/326.1; 425/378 R;
425/379 R; 425/388
[58] Field of Search .................. 264/519, 560–569,
264/556–559, 237, 348, 209.3–209.7; 425/326.1,
71, 72 R, 378 R, 379 R, 388

[56] References Cited

U.S. PATENT DOCUMENTS

| 2,966,700 | 1/1961 | Dyer et al. | 425/326.1 |
| 3,329,999 | 7/1967 | Cook | 425/72 R |
| 3,522,337 | 7/1970 | Ball | 264/569 |
| 3,541,191 | 11/1970 | Thordarson | 264/237 |
| 3,618,169 | 11/1971 | Coast | 264/565 |
| 3,742,105 | 6/1973 | Kuroda | 264/237 |
| 3,851,028 | 11/1974 | Beyer | 264/237 |
| 4,088,724 | 5/1978 | Kuhnert | 425/326.1 |
| 4,165,356 | 8/1979 | Heider | 264/519 |
| 4,176,155 | 11/1979 | Heisterkamp | 425/326.1 |

FOREIGN PATENT DOCUMENTS

| 774475 | 12/1967 | Canada | 425/326.1 |
| 1504092 | 6/1969 | Fed. Rep. of Germany . | |
| 2506517 | 2/1976 | Fed. Rep. of Germany . | |
| 3241005 | 8/1984 | Fed. Rep. of Germany ... | 264/209.4 |
| 1489450 | 3/1967 | France . | |
| 7115579 | 5/1972 | Netherlands . | |
| 7605753 | 5/1976 | Netherlands . | |
| 1153604 | 5/1969 | United Kingdom | 425/326.1 |

Primary Examiner—Jeffery Thurlow
Attorney, Agent, or Firm—Brumbaugh, Graves, Donohue & Raymond

[57] ABSTRACT

In a device for the extrusion of a tube the extruded tube (2) is guided by a piston (20) placed inside said tube (2) at a distance from the extrusion head (1) the cooling of the extruded tube (2) is improved by means of nozzles (13) which spray water (5) at an angle against the inside of the tube (2) and away from the extrusion head (1), the said water sprays further kept away from the extrusion head by a fan (17) which blows air through the tube (2) away from the head (1) means (14–22) being provided for the supply and discharge of water and air respectively.

4 Claims, 2 Drawing Sheets

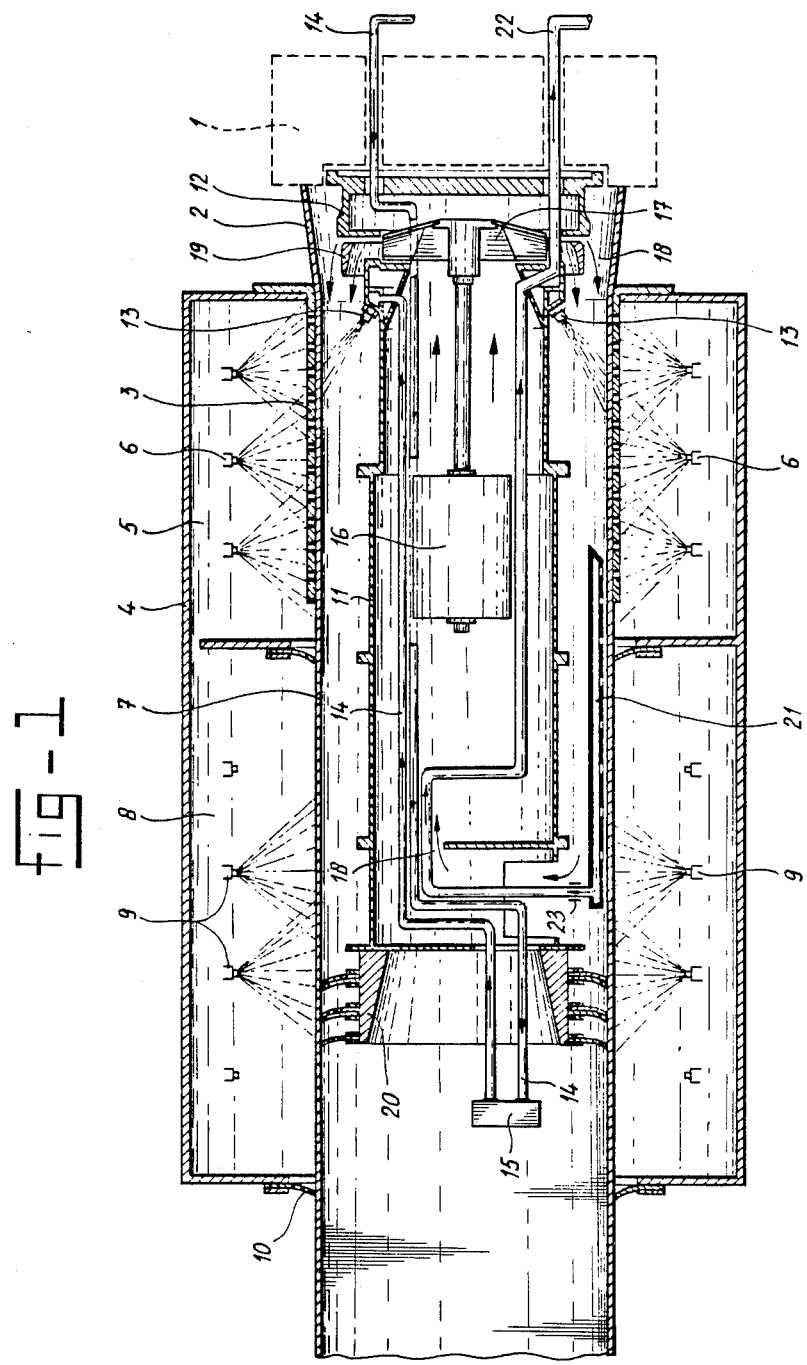

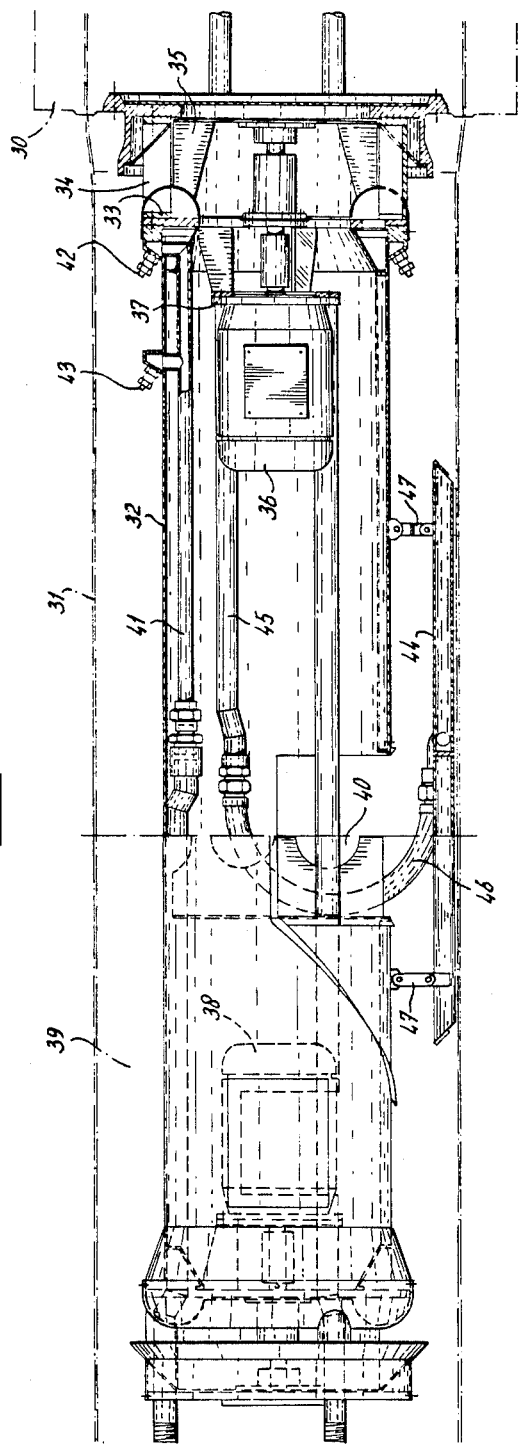

DEVICE FOR THE PRODUCTION OF A TUBULAR OBJECT

The invention relates to a device for the production of a tubular object of indefinite length, comprising an extrusion apparatus with annular extrusion aperture, closure means at a distance from the extrusion apparatus, which closure means are fastened on that part of the extrusion apparatus situated inside the extrusion aperture, a callibration device which grips the outside surface of the extruded object and, situated between the extrusion apparatus and the closure means means for cooling the outside of the object coming out of the extrusion nozzle and means for cooling the inside of the extruded object said means for cooling the inside consisting of a ring of sprayers, the spray direction of which is directed at an angle against the inside of the object and away from the extrusion aperture.

Such a device is known from published Dutch patent application No. 7115579. In it the tubular object, after leaving the extrusion nozzle, is conveyed through the calibration device, by means of which the outside surface acquires a predetermined diameter. At the same time, the inside surface and the outside surface of the object are cooled by means of cooling water which is sprayed on these surfaces.

In order to prevent the cooling water from flowing away through the inside of the tubular object and in particular from flowing towards the extrusion nozzle sealing means are provided at a distance from the extrusion nozzle which sealing means engage the inside surface of the tubular object to obtain a sealing. According to said known device the cooling by means of the jets takes place at an angle and directed away from the extrusion device, which jets are placed between the upstream and downstream located sealings which engage the tubular object.

The sealings placed upstream of the water jets do engage the still hot and weak tubular object with the result that the sealing is bad. In practice sealings at that location do not properly seal and have to be replaced every day.

From British Pat. No. 1,594,953 a device is known having an insulation layer on that part of the hot extrusion nozzle situated inside the annular extrusion aperture. The object of this layer is to protect the nozzle from being cooled by the cooling water. In this known device the problem is that, despite the presence of the insulation layer, the inside surface of the tubular object is unevenly cooled. As a result, bubbles and weak points form in the wall, which adversely affect the tubular object. In this known device the risk still exists that water flows back towards the extrusion nozzle.

Both prior art devices do have said disadvantage.

The object of the invention is to provide a device in which the inside surface of the extruded tubular object can be uniformly cooled.

This object according to the invention is achieved in the first place in that between the means and the extrusion apparatus there is a fan by means of which air can be blown through the object in a direction away from the extrusion nozzle, means being present for the infeed and discharge of air for and from the fan respectively and means are present for the supply and discharge respectively of cooling water.

In the device according to the invention, the cooling water cannot reach the extrusion nozzle on account of the spraying direction of the sprayers and the blowing direction of the fan. This applies to the mist which forms during the spraying. The cooling water which collects on the lowest part of the tubular object is carefully and directly drawn off, which is important for achieving uniform cooling. No insulation layer need be provided to protect the hot nozzle from being cooled by the cooling water.

Sealing means as the end of the device or where the known device engages the innerside of the extruded object by means of a sealing or piston, also are disadvantageous with respect to the smoothness of the inner surface of the object.

According to another solution of the invention this can be avoided in that the said closure means comprise a second fan which can blow air into the interior of the extruded object in a direction opposite to the direction of flow of the first fan and that between the two fans a sleeve has been provided having an outer diameter which is smaller than the inner diameter of the extruded object and provided with at least one opening through which air may flow from the space between sleeve and extruded object back towards the respective fans.

With said second fan water flowing away from the extrusion nozzle through the interior of the object is blown in the opposite direction and can then be taken away by a suction device located between the two fans. In this way a closure is obtained without direct contact with the innerside of the extruded object.

The device can be such that the two fan motors are placed inside a sleeve with the openings receiving the return air flow.

It is of course recommendable that the two fans have the same capacity such that one fan should not overrule the other so that the two opposite flows together can escape from the space between object and central sleeve through the openings of said sleeves and return to the respective fans.

The intensity of the cooling on the inside surface and on the outside surface of the tubular object can now be selected in such a way that mainly compressive stresses prevail near the inside surface of the finished tubular object and mainly tensile stresses prevail near the outside surface. This has the advantage that when the tubular object is cut through perpendicular to its axis the area surrounding the cut edge curls outwards in axially symmetrical fashion due to the axial component of the above-mentioned stresses. These outwardly curled areas act as flanges which ensure the inherent stability of the pieces cut off.

This is achieved according to the invention in that the process for application of the invention is carried out in such a way that the cooling of the inside surface is greater than that of the outside surface. This can take place by spraying cooling water of a lower temperature or by spraying a greater quantity of cooling water per unit time on the inside surface, or possibly combined with the above—by shifting the times of inside and outside cooling relative to each other in time in such a way that the envisaged outward curling is achieved through released tension. The means provided in the device for guiding the air stream produced by the fan can be designed in such a way that the part of the air stream which passes along the inside surface of the tubular object faces away from the extrusion nozzle. This can be achieved according to the invention in that the piston is fastened to a hollow pipe which is positioned axially relative to the center line of the extrusion aperture and has air inlet openings near the piston and air outlet openings before the fan.

According to the invention, the calibration device is designed in such away that it has a jacket with a guide wall of the object provided with openings, through which jacket cooling liquid can be fed, and which is connected to a vacuum source. Through the holes the outside surface of the tubular body is drawn against the calibration device as a result of the vacuum prevailing in the jacket. In this way good calibration is obtained, while the cooling water cannot escape either.

it is observed that from published Dutch patent application No. 7605758 a device is known having inside the extruded tubular object a fan by means of which air can be blown in the direction opposite to the direction of extrusion. In this known device an internal cooling mandrel is used. No water is blown against the inside of the extruded object. The air flow serves as friction reducing means between said cooled mandrel and the inner surface of the extruded object.

The device according to the invention now will be further explained with reference to the drawings.

FIG. 1 indicates schematically in section one embodiment of the device according to the invention.

FIG. 2 shows in the same way another embodiment.

In FIG. 1 reference number 1 indicates the schematically illustrated extrusion nozzle, from which the extruded tubular object 2 emerges. This tubular object 2 is then conveyed through the calibration device 3 which is placed in a jacket 4 in which a vacuum prevails.

Through this vacuum the outside surface of the tubular object 2 is drawn against the calibration device 3 provided with holes. Disposed in the part 5 of the jacket 4 where the calibration device is located are a number of sprayers 6 arranged in a circle around the extruded object 2. Through holes in the calibration device 3, these sprayers spray cooling water at a temperature of 60° C. onto the outside surface 7 of the extruded object 2. Located in the part 8 of the jacket 4 is a second set of sprayers 9, which are disposed in a circle around the extruded object 2. These sprayers 9 spray cooling water at a temperature of 20° C. deg.C. onto the outside surface 7. The jacket 4 is closed off from the extruded object 2 by a flexible collar 10. Disposed in the inside of the tubular object 2 is a hollow pipe 11, which is fastened with a transition piece 12 to the extrusion nozzle 1. Disposed in a circle on the outer periphery of the hollow pipe 11 are a number of sprayers 13 which spray cooling water at a temperature of 20° C. at an angle facing away from the extrusion nozzle 1 against the inside surface of the extruded object 2. This cooling water is fed in via a feed pipe 14, which runs through the extrusion nozzle 1, and a filter 15. Disposed inside the coaxial pipe 11 is a motor 16 which drives a fan. The fan 17 generates an air stream 18 which emerges through an air outlet opening in the hollow pipe 11 and is conveyed via an annular vane 19 in the direction away from the extrusion nozzle 1, along the inside surface of the tubular object. At the end of the hollow pipe 11 opposite the extrusion nozzle 1 is a passage through which the air stream 18 can enter the interior of the hollow pipe 11 and can flow back to the fan 17. Attached at this end of the hollow pipe 11 is also a piston 20, which supports the inside surface of the tubular object in sealing fashion, and in which there is an opening for the passage of the pipes 14 and to regulate the pressure balance of the air stream 19 circulating round the hollow pipe. Disposed on the lowest part of the tubular object 2 is a suction pipe 21 with holes. It is hingedly connected at 23 to a suction line 22 which is fed through the extrusion nozzle and by means of which the cooling water can be removed from the tubular object 2. The pipe 21 trails along the bottom of the extruded object.

In FIG. 2 the extrusion nozzle is indicated at 30 and the extruded object with 31.

Attached to the front plate of the extrusion nozzle 30 is a central sleeve 32 by means of support brackets generally indicated at 33 and forming flow channels 34 for a fan 35 of a first fan motor 36 attached by means of a flange 37 inside the sleeve 32.

At the left hand end in FIG. 2 a second fan motor 38 with fan 39 has been provided and mounted inside the sleeve 32. Both fans blow air into the space 39 in opposite directions which air can return through openings 40 of the sleeve.

The water supply pipes 41 do not in principle differ from the embodiment shown in FIG. 1. They supply water to the jets 42 and 43. The jets 42 form a complete circle. The jets 43 only a part circle over the upper portion of the sleeve 32.

Water collected in the lower portion of the extruded object is sucked away by means of the suction tube 44 connected to the tube 45 by means of hose 46. This tube is swingably supported according to a parallelogram system 47 to keep the suction tube parallel to the lower wall of the extruded object.

What is claimed is:

1. An apparatus for the production of a tube of an indefinite length and a precise predetermined diameter comprising:
    an extrusion die having an annular extrusion aperture for extruding said tube,
    closure means situated at a distance from the extrusion die for limiting an internal area to be cooled inside the extruded tube,
    a calibration device for engaging an outer surface of the extruded tube, located longitudinally in the direction of the extruded tube between the extrusion die and the closure means, and
    means for cooling the outer and inner surfaces of the extruded tube; said inner surface cooling means comprising a ring of water jets for directing a spray of water at an angle against the inner surface of the tube and away from the extrusion die, a fan located between the extrusion die and the water jets for directing an air flow away from the die and means for feeding and discharging said air and said water.

2. An apparatus according to claim 1 further comprising a second fan placed inside the tube at the location of the closure means for directing an air flow opposite to the direction of flow of the first fan, a sleeve disposed between inlet sides of the two fans having an outer diameter smaller than the inner diameter of the tube, said water jets being outside said sleeve, and an opening in a wall interconnecting the inside of the sleeve with the annular space between said sleeve and said tube.

3. An apparatus according to claim 2 wherein said sleeve has mounted therein fan motors for driving said two fans.

4. An apparatus according to claim 1 wherein the closure means are formed by a piston fastened to a hollow pipe positioned axially relative to a center line of the extrusion aperture having inlet openings near the piston end and fan outlet openings.

* * * * *